(12) United States Patent
Emani et al.

(10) Patent No.: US 8,855,925 B2
(45) Date of Patent: Oct. 7, 2014

(54) ADAPTABLE NAVIGATION DEVICE

(75) Inventors: Sitaram Emani, Farmington Hills, MI (US); Tarun Inabathuni, Farmington Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 141 days.

(21) Appl. No.: 13/354,612

(22) Filed: Jan. 20, 2012

(65) Prior Publication Data

US 2013/0191020 A1  Jul. 25, 2013

(51) Int. Cl.
  *G01C 21/36* (2006.01)
  *G01C 21/34* (2006.01)

(52) U.S. Cl.
  CPC ........ *G01C 21/3697* (2013.01); *G01C 21/3492* (2013.01)
  USPC ........... 701/428; 701/429; 701/437; 701/439; 701/440; 701/484

(58) Field of Classification Search
  CPC ........... G01C 21/3655; G01C 21/3667; G01C 21/3632; G01C 21/3415; G01C 21/3492; G01C 21/3461; G01C 21/3697
  USPC ......... 701/468, 484, 428, 429, 437, 439, 440, 701/444
  See application file for complete search history.

(56) References Cited

U.S. PATENT DOCUMENTS

| | | | |
|---|---|---|---|
| 7,421,339 B2 * | 9/2008 | Jeon .............................. | 701/431 |
| 8,073,618 B2 * | 12/2011 | Harumoto et al. ............. | 701/414 |
| 8,099,236 B2 * | 1/2012 | Olson et al. .................... | 701/423 |
| 8,606,457 B2 * | 12/2013 | Odinak et al. ................. | 701/31.4 |
| 2009/0216431 A1 * | 8/2009 | Vu et al. ......................... | 701/201 |
| 2010/0324817 A1 * | 12/2010 | Hansen et al. ................. | 701/210 |
| 2011/0118965 A1 * | 5/2011 | Aben et al. ..................... | 701/117 |
| 2011/0288766 A1 * | 11/2011 | Nagasawa et al. ............. | 701/201 |

* cited by examiner

*Primary Examiner* — John R Olszewski
*Assistant Examiner* — Todd Melton
(74) *Attorney, Agent, or Firm* — Leydig, Voit & Mayer, Ltd.

(57) ABSTRACT

The described method and system provide for adaptable GPS navigation based on road and traffic conditions. A method includes: receiving input front a user designating a destination; determining a calculated route from a starting point to the destination; and presenting turn-by-turn (TBT) directions based on the route, wherein the presenting of the TBT directions includes presenting conditions information received from an external source. The conditions information can be used during route calculation and can be updated while the user is traveling on the calculated route.

12 Claims, 5 Drawing Sheets

ADAPTABLE NAVIGATION DEVICE

FIELD

The present disclosure relates generally to systems and methods for GPS (Global Positioning System) navigation.

BACKGROUND

Telematics units within mobile vehicles provide subscribers with connectivity to a telematics service provider (TSP). The TSP provides the subscriber with an array of services ranging from emergency call handling and stolen vehicle recovery to diagnostics monitoring and turn-by-turn navigation. Telematics units are often provisioned and activated at a point of sale when a subscriber purchases a telematics-equipped vehicle. Upon activation, the telematics unit is utilized to provide a subscriber with the telematics services.

One of the services conventionally provided by TSPs to users of telematics units is GPS navigation, which includes the provision of Turn-by-Turn (TBT) directions. In addition to GPS navigation being provided to drivers through GPS-based navigation aid devices (referred to herein as "GPS devices") integrated into or in communication with telematics units, GPS navigation is also provided through the use of stand-alone GPS devices.

To use GPS navigation, a user of the telematics unit enters or selects a destination, and the GPS device provides directions (e.g., through a display and/or through vocal instructions) to the user based on a calculated course from the user's current location to the user's destination. When a user does not follow the directions and goes off-course (i.e., when the position of the vehicle is not on the calculated course), the GPS device recalculates a new course for the user to take based on the vehicle's position when it goes off-course.

Conventional GPS devices provide route calculation and TBT directions according to rigid rules programmed into the devices and thus are unable to adapt to the ever-changing variable circumstances that drivers encounter on the roads.

The above body of information is provided for the convenience of the reader. The foregoing is a discussion of problems discovered and/or appreciated by the inventors, and is not an attempt to review or catalog the prior art.

SUMMARY

A system and method are described for providing adaptable GPS navigation based on road and traffic conditions. In one implementation, a method is provided for providing navigation instructions in a computerized system including a GPS-based navigation aid device, the method including: receiving input from a user designating a destination; determining a calculated route from a starting point to the destination; and presenting turn-by-turn (TBT) directions based on the route, wherein the presenting oft TBT directions includes presenting conditions information received from an external source.

In further implementations, the presenting of TBT directions further includes determining a degree of advance notification for notifying the user of an upcoming event, which involves determining a classification level corresponding to the conditions information and/or applying a weighting function to values corresponding to the conditions information.

The conditions information, for example, includes information pertaining to traffic conditions and road conditions, and road conditions, for example, include information pertaining to weather, road construction, accidents, and roadway features.

In yet another further implementation, the determination of the route includes receiving, from a call center, the calculated route, wherein the calculated route is based on the conditions information received from the external source, and the conditions information received from the external source is responsive to the destination designated by the user.

In other implementations, computer-executable instructions are provided on a tangible non-transient computer-readable medium part of a device for GPS navigation. In a further implementation, the device is integrated with a telematics unit in a vehicle.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

In general terms, not intended to limit the claims, a system and method is provided for adaptable GPS navigation based on road and traffic conditions. The adaptable GPS navigation described herein is performed by stand-atone GPS devices or integrated GPS devices, such as GPS devices integrated into a telematics unit on a vehicle.

Figure 1:
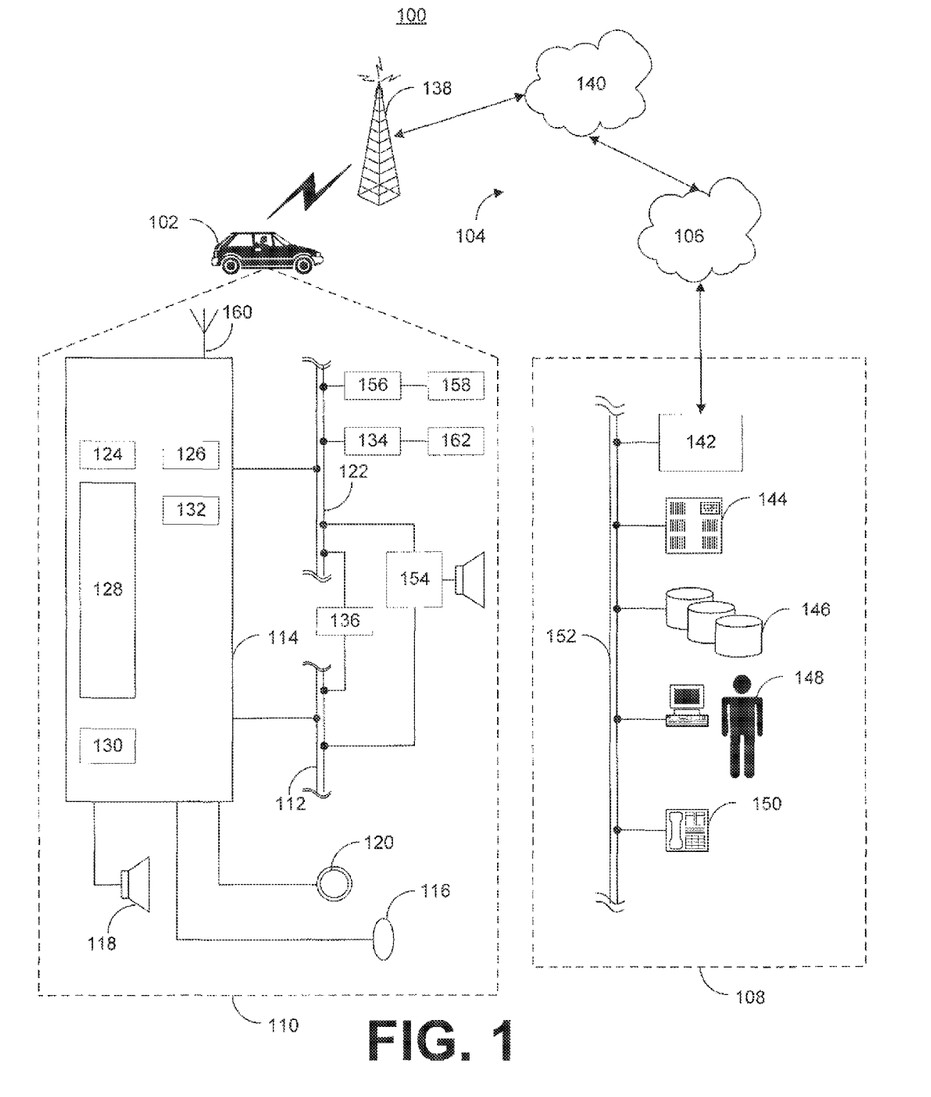
FIG. 1 is a schematic diagram of an operating environment for a mobile vehicle communication system usable in implementations of the described principles.

Given this overview, an exemplary environment, suitable for various implementations is described hereinafter. It will be appreciated that the described environment is an example, and does not imply any limitation regarding the use of other environments. With reference to FIG. 1 there is shown an example of a communication system 100 that is used with the present method and system and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane., etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device, that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 is called the network access device (NAD) of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle.

In this exemplary environment, GPS navigation services are implemented based on the geographic position information of the vehicle provided by the GPS based chipset/component 132. For example, a user of the telematics unit enters a destination using inputs corresponding to the GPS component, and a route to a destination is calculated based on the destination address and a current position of the vehicle determined at approximately the time of route calculation. Turn-by-turn (TBT) directions are further be provided on a display screen corresponding to the GPS component and/or through vocal directions provided through a vehicle audio component 154. It will be appreciated that the calculation-related processing occurs at the telematics unit or at a call center 108.

Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions are sent and/or received over the voice channel. Vehicle communications are enabled via the cellular chipset/component 124 for voice communications and a wireless modem 126 for data transmission.

In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech.

The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 contains a speaker system or utilizes speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center includes a remote data server.

As appreciated by those skilled in the art, various cell tower/base station/MSC arrangements are possible and could be used with wireless system 104 (also referred to as the "cellular network" herein). For example, a base station and a cell tower could be co-located at the same site or they could be remotely located, and a single base station could be coupled to various cell towers or various base stations could be coupled with a single MSC, to name but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

It will be appreciated by those of skill in the art that the execution of the various machine-implemented processes and steps described herein occur via the computerized execution of computer-executable instructions stored on a tangible computer-readable medium, e.g., RAM, ROM, PROM, volatile, nonvolatile, or other electronic memory mechanism. Thus, for example, operations performed by the telematics unit and/or GPS device are carried out: according to stored instructions or applications installed on the telematics unit and/or GPS device, respectively.

It will further be appreciated that, although the environment described above pertains to a telematics unit in a vehicle, the principles described herein are not limited to telematics units or vehicles and are also implemented on standalone GPS devices and other types of GPS devices (such as those provided on mobile phones). Information regarding road and traffic conditions is received via cellular receivers, radio signal receivers, and/or other types of receivers connected to a stand-alone GPS device or other types of GPS devices.

Figure 2:
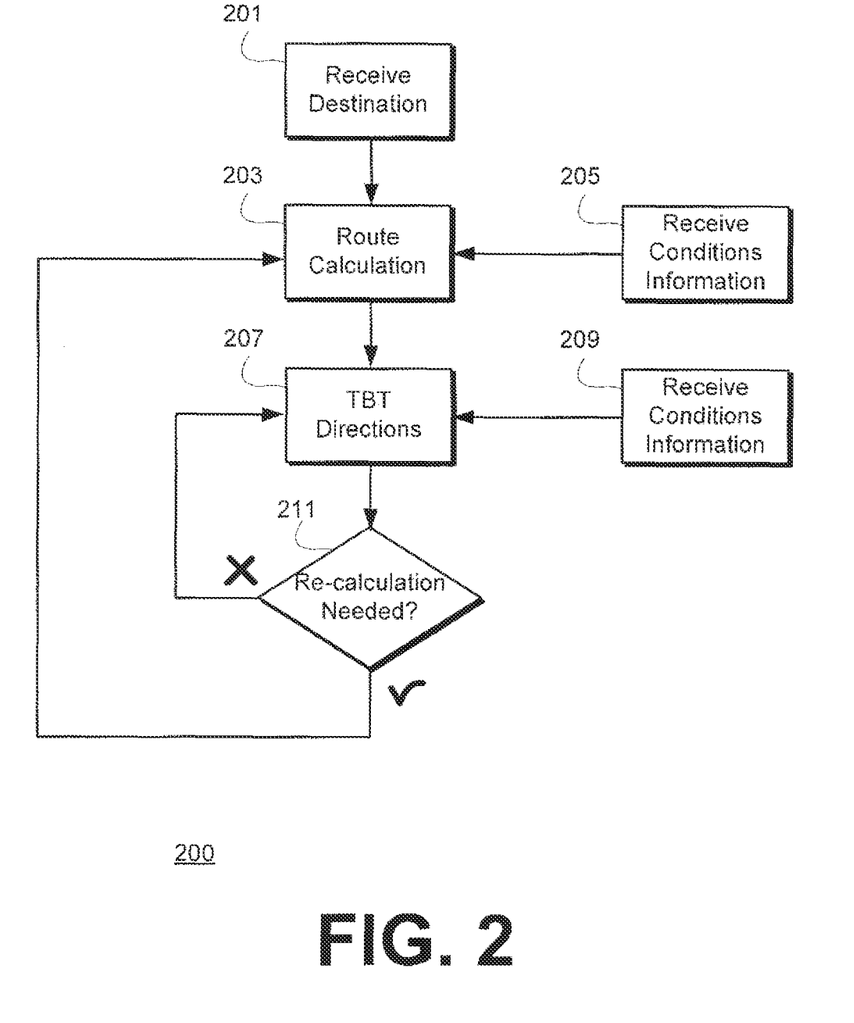
FIG. 2 is a flowchart illustrating a process for GPS navigation in accordance with an implementation of the described principles.

With further reference to the exemplary system architecture of FIG. 1, and turning to FIG. 2, an exemplary process 200 for performing adaptable GPS navigation based on traffic and road conditions is depicted. Generally, to begin the process, during 201, a user-selected or user-input destination is received at a GPS device, During 203, the GPS device or the call center performs a route calculation based on that destination from a starting position—which is user-selected or user-input or based on the current position of the GPS device or vehicle. If the route calculation is performed by the call center, the calculated route is sent to the vehicle telematics unit over a wireless network.

In accordance with an exemplary implementation, during 205, conditions information is received by the GPS device or the call center performing the route calculation. In an implementation, this conditions information is used during 203 in the route calculation process. Conditions information includes but is not limited to information pertaining to traffic conditions (e.g., including but not limited to the severity of congestion, average speed, expected times of congestion, etc.), road conditions including but not limited to weather conditions, construction conditions, accident: conditions, roadway features such as blind spot turns, etc.), vehicle conditions and capabilities (e.g., speed, acceleration, horsepower, etc.), driver habits, and speed limits associated with the road(s) on the route, in a further implementation, the types of conditions information gathered or received by the call center or GPS device performing the route calculation is responsive to the requested destination or an initially calculated route. For example, if an initially calculated route includes a school zone or a highway leading into a city, responsive conditions information includes the time of day to determine whether school zone speed limits or morning rush hour apply, respectively. The calculated route can then be updated if the initially calculated route is not the optimal route based on the conditions information.

In another example, the GPS device or call center calculates expected travel times along a number of potential routes, taking into account the conditions information along each potential route and selecting the route with the shortest travel time. Thus, potential routes that contain roadways with reduced lanes due to construction or severe congestion at certain times of day can be discarded in favor of a route that has a longer distance but has less congestion associated with it if the overall travel time on the route with a longer distance is shorter, it will be appreciated that a variety of ways to calculate a route in combination with the consideration of conditions information are contemplated, including those where the user specifies certain preferences (e.g., users selecting an option to avoid certain types of roads such as tollways or highways) or those preferences are accounted for based on the user's past driving habits. It will further be appreciated that, in the exemplary architecture shown in FIG. 1, route calculation is performed at the vehicle based on conditions information received from the call center or other external sources, or route calculation is performed at the call center with the telematics unit of the vehicle serving as a user interface for GPS navigation.

After the route is calculated, during 207, the GPS device provides TBT directions based on the calculated route. For example, at a determined distance prior to certain events (e.g., making a turn, merging onto or off of a ramp, continuing on a certain road, arriving at a destination, etc.), the GPS device, through a user interface, displays and/or audibly announces the upcoming event to the user of the GPS device. In one implementation, the determination of how early the notification (i.e., the instruction and/or announcement) should be made to the user is based on actual current conditions information (e.g., from satellites or other external sources) received during 209 while driving. The frequency at which the conditions information is updated can depend on a variety of factors, such as power consumption, amount of available bandwidth, and the route being traveled. In an alternative implementation (e.g., a power-saving implementation where new conditions information is not being updated after route calculation), the determination during 207 is based on the conditions information previously received at 205 during the route calculation.

For example, if the vehicle is traveling on a roadway which is severely congested according to the received conditions information, the notification is made earlier (i.e., at a farther distance prior to the event) such that the driver is adequately prepared to make lane changes, if necessary, and execute any action needed by the driver (e.g., making a turn). In another example, if the vehicle is traveling on a roadway that is not congested but the flow of traffic is moving very quickly, the notification is also made relatively early (i.e., at a farther distance prior to the event) since the vehicle will be approaching the event relatively quickly. In yet another example, if the roadway is not congested and is moving very slowly, the notification is made relatively later at a closer distance to the event) since the vehicle will be approaching the event relatively slowly. In a further implementation, conditions information can also trigger rerouting of the calculated route if the conditions information indicates severe congestion or road blockage.

In yet another example, the user is also notified of roadway features, and the existence of certain types of roadway features is utilized in determining when notification is necessary. For example, certain intersections, such as those containing a blind spot turn or where accidents are often reported to occur, are designated as dangerous. These dangerous intersections are highlighted on the display of the user interface (e.g., by coloring the navigation path in red where a dangerous condition such as blind spot turning is detected and otherwise coloring the navigation path as green), and the GPS device specifically notifies the user that the user is approaching a dangerous intersection. The notification is made relatively early with specific and/or repeated warning (e.g., notifying the user to pay close attention because the next turn is a blind spot turn) to ensure that the user is adequately prepared. In further implementations, the GPS device also notifies the user of other hazardous conditions such as those related to weather (e.g., lee on the roadway) or construction (e.g., when workers are present) by providing different coloration of the navigation path and early notification. It will be appreciated that conditions information pertaining to hazardous conditions or roadway features are also used, in particular implementations, during route calculation to provide the user with an optimal route based on time-to-destination as well as safety.

It will he appreciated that the GPS device receives conditions information pertaining to traffic and road conditions from a variety of sources. For example, there are a variety of organizations and entities that collect information regarding traffic, weather, accident reports, road construction, and the like. This information is sent wirelessly to a GPS device over the air based on the type of receiver used by the GPS device. For example, sonic GPS devices are connected to cellular components and receive conditions information over a cellular network, while other GPS devices receive data via an FM radio receiver.

With reference to 211, while the vehicle is proceeding towards the destination, sometimes route re-calculation becomes necessary. If re-calculation is needed—e.g., when the user goes off-course or requests a new destination—the method returns to 203 wherein the GPS device performs route calculation. If at 211, route re-calculation is not necessary, then the method proceeds to 207 wherein the GPS device continues to provide TBT directions to the user.

Figure 3:
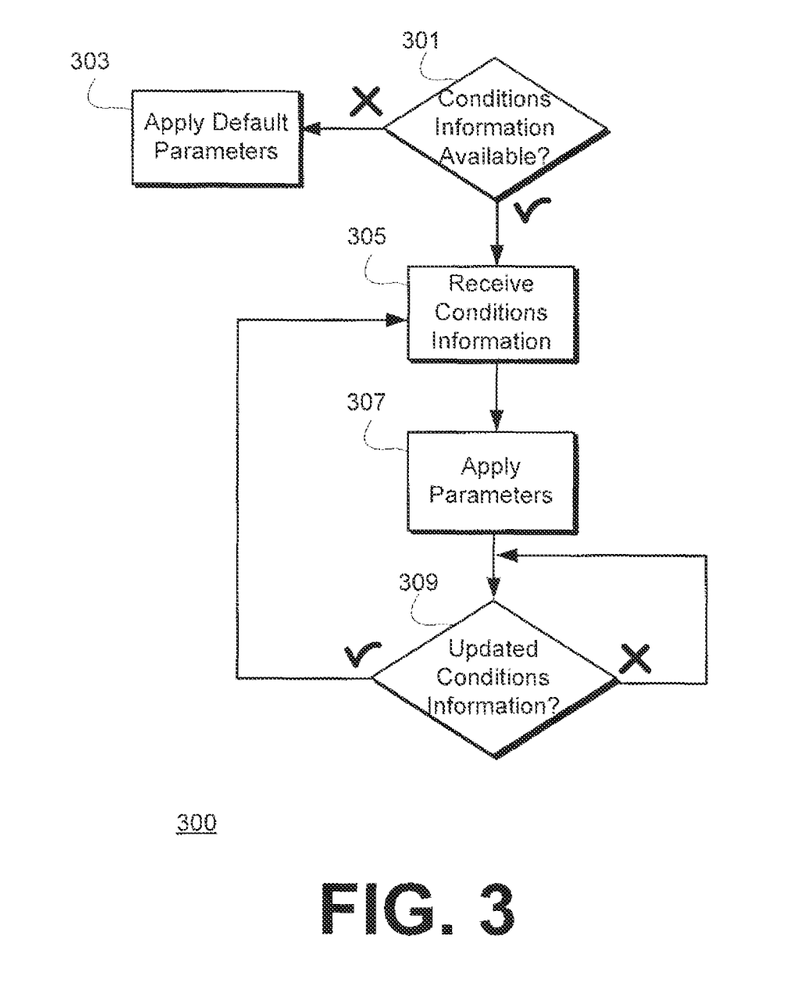
FIG. 3 is a flowchart illustrating a process for providing TBT directions based on conditions information in accordance with an implementation of the described principles.

With continued reference to the exemplary system architecture of FIG. 1 and the general process depicted by FIG. 2, an exemplary process 300 for the provision of TBT directions based on received conditions information is depicted by FIG. 3. Conditions information might not be available for every route or roadway due to lack of coverage (typically associated with less densely populated or less frequently traveled areas). Thus, with reference to 301, if conditions information is not available for a given route that a vehicle is traveling on, during 303, a set of default parameters is applied by the GPS device. For example, an exemplary default parameter is to notify the user of upcoming events approximately 1000 meters in advance of the event and to highlight the entire navigation path as a certain color (e.g., green).

In another example, at 301, if conditions information is available for a route that the vehicle is traveling on, during 305 the conditions information is received by the GPS device, and, during 307, a set of parameters based on the conditions information is applied during the provision of TBT directions. Parameters to be considered include but are not limited to the time of day (e.g., to determine whether it is rush hour, whether school zone speed limits will apply, etc.) and road conditions (e.g., repairs, steep curves, hazardous turns, weather conditions, etc.). It will be appreciated that in other alternative implementations, a variety of methods are used to determine the set of parameters to be used based on the conditions information.

In one exemplary implementation, different classification levels are used with a set of parameters associated with each classification level. For example, "low," "medium," and "high" classification levels are used with "low" corresponding to a low level of advance notification needed, "medium" corresponding to a moderate or default level of advance notification needed, and "high" corresponding to a high level of advance notification needed. Based on the conditions information received at the GPS device, the GPS device designates a current route or roadway as corresponding to one of the three levels. For example, if the conditions information indicates severe congestion and roadwork going on for an area of a certain roadway, the GPS device designates that area as "high" and provides notifications to the user of upcoming events approximately 2000 meters in advance, and the event is marked in red with a caution indicator, in another example, if the conditions information indicates low congestion as well as slow flow of traffic in an area of the roadway, the GPS device designates that area as "low" and provides notifications to the user of upcoming events approximately 500 meters in advance with the entire navigation path colored in green and no caution indicators.

In a further exemplary implementation, when multiple conditions need to be considered (e.g., traffic flow, congestion, road work, hazardous roadway features, weather, etc.), each existing condition is assigned a certain value based on severity and importance, and the multiple conditions are weighted according to a weighting function to determine a classification level. It will be appreciated that the above examples are merely exemplary and that in other implementations, more or less than three classification levels are used with different or the same conditions information parameters.

In another implementation, the process for weighting the received conditions information is more flexible with the degree of advance notification being based directly on values assigned to each condition. For example, in one situation the GPS device determines that advance notification should be provided at approximately 700 meters before an event, while in other situations it is 800, 900, 1000, or any other value, wherein the distance is directly based on a weighting of the values assigned to the received conditions information without the assignment of a classification level. It will be appreciated that weighting functions and variations thereof are within the grasp of one skilled in the art based on available conditions information and the preferences of the designer. It will further be appreciated that in alternative implementations the degree of advance notification is determined in units other than units of distance, such as units of time (estimated from expected arrival at the next event).

During the provision of TBT directions, with reference to 309, if updated conditions information is available, the method returns to 305 wherein the updated conditions information is received by the GPS device. Using the updated conditions information, during 307, an updated set of parameters is applied to the GPS navigation process. If no updated conditions information is available at 309, the provisions of TBT directions continue based on the previously applied parameters. It will be appreciated that in some situations (not depicted by FIG. 3), updated conditions information triggers route re-calculation, such as in the event of severe congestion, accident reports along the previously calculated route, or road closures due to construction.

Figure 4:
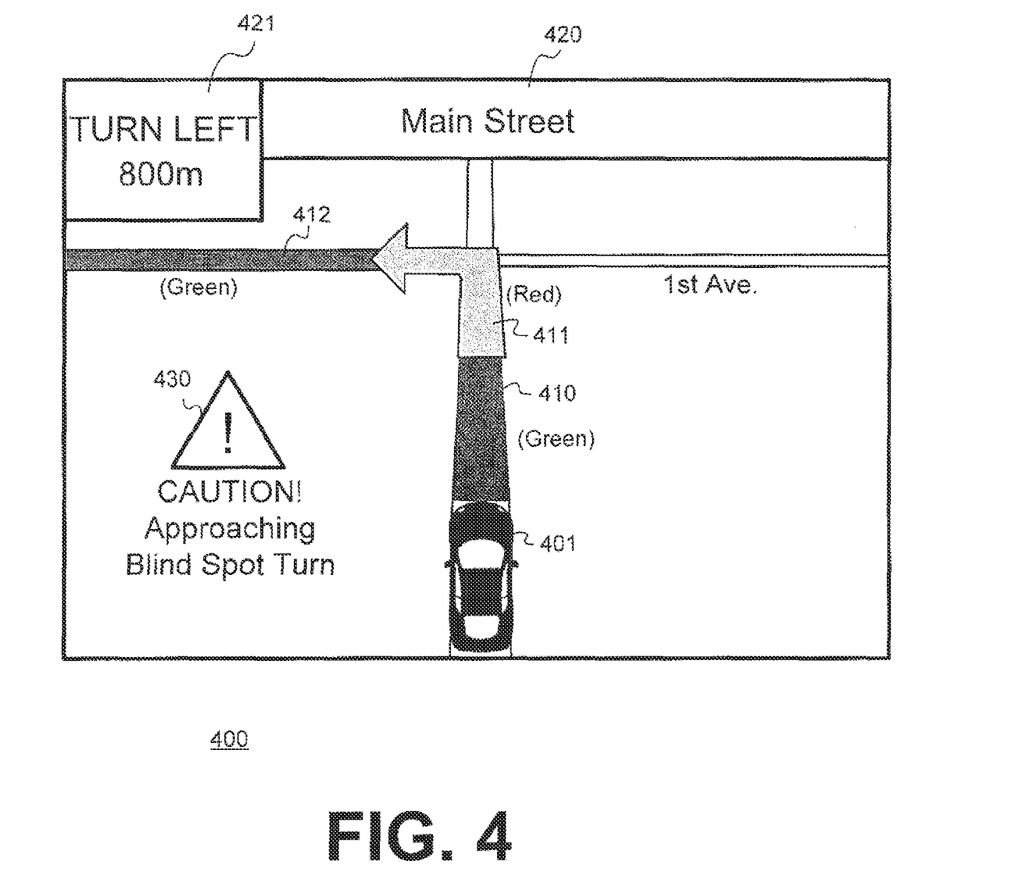
FIG. 4 is a diagram illustrating an exemplary user interface in accordance with an implementation of the described principles.

A diagram 400 of an exemplary GPS device display is provided in FIG. 4 to illustrate an exemplary implementation. The display includes a vehicle indicator 401 that shows the position of the vehicle, which in this example is traveling on "Main Street." The calculated route to the destination shows that the vehicle should take a left turn on "1st Ave." and is colored in green 410, 412. The display also includes a bar 420 at the top that displays the current street that the vehicle is traveling on as well as a box containing a notification for the next event 421, which in this example is to turn left in 800 meters.

Given that the conditions information received by the GPS device in this example have indicated that the left turn from "Main Street" to "1st Ave," is a blind spot turn, the GPS device causes the turn arrow indicator 411 to be displayed in the color red to draw the user's attention to the potential hazard. A caution indicator 430 that describes the nature of the potential hazard is also provided. Additionally, the user is audibly warned about the potential hazard, in various implementations, the user is audibly notified of the next action (to turn left in a certain amount of meters) at any appropriate time based on a determination of how early in advance the user should be notified as described above with respect to FIG. 3. The box in the display for the next event notification 421 also appears at any time before or after or simultaneously with the audible notification and is updated based on the vehicle's progress along "Main Street."

Figure 5:
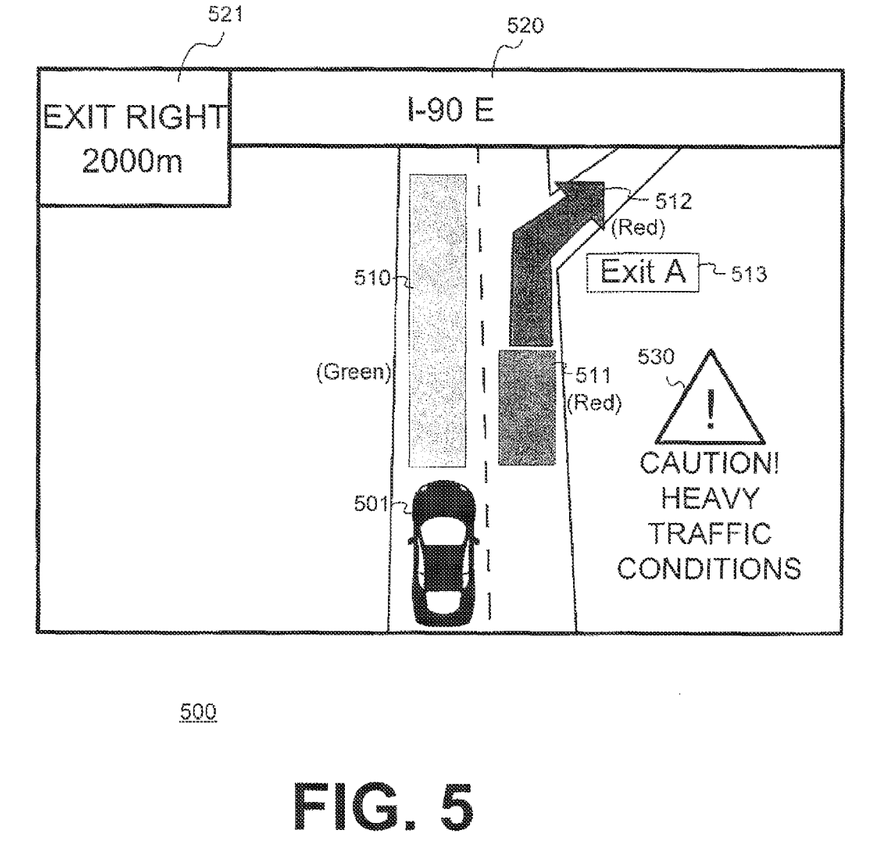
FIG. 5 is another diagram illustrating another exemplary user interface in accordance with an implementation of the described principles.

Another diagram 500 a GPS device display in another exemplary situation is provided in FIG. 5. The display includes the vehicle indicator 501 showing the position of the vehicle and a bar 520 across the top showing that the vehicle is traveling along the highway "I-90" East. There is a green traffic indicator 510 on the map showing that the current lane the vehicle is in is not congested, and there is also a red traffic indicator 511 in the other lane showing that the other lane is congested. The next action in the route calculated for the vehicle 501 is to exit right 521 at Exit A, which is marked in a box 513 on the display. Because the exit lane is congested, the next action arrow indicator 512 is shown in red, and a caution indicator 530 is presented to the user to warn the user of the heavy traffic conditions at the exit. Additionally the next action notification box 521 alerts the user that the vehicle needs to exit right in 2000 meters.

It will be appreciated that FIGS. 4 and 5 are merely exemplary and provide examples of how a GPS device display appears to a user. One skilled in the art could readily vary the content, layout, design, and displayed information within such a display without departing from the principles described herein.

It is thus contemplated that other implementations may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element, as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for providing navigation guidance warnings in a vehicle having a computerized system including a satellite-based navigation aid device, the method comprising:
   receiving input designating a destination for the vehicle;
   determining a route comprising a plurality of segments between a starting point to the destination;
   receiving, from an external source, current conditions information relating to a current segment of the plurality of segments;
   receiving, from either the external source or a further external source, additional information relating to a known hazard located on a segment of the plurality of segments, wherein the known hazard corresponds to a roadway feature associated with a vehicle accident risk;
   determining a guidance alert to be provided to the user relating to the current segment;
   determining, based on the current conditions information and the additional information, an adjustment parameter representing modifying a magnitude for advanced notification of a driver action on the current segment;
   recalculating a point on the current segment at which the guidance alert issues based upon a default value and the adjustment parameter; and presenting turn-by-turn (TBT) directions to a user based on the determined route;

wherein the method further comprises, during the presenting the TBT directions, presenting the guidance alert at the point on the current segment and presenting a hazard alert notifying the user of the known hazard.

2. The method of claim 1, wherein the adjustment parameter is a classification level selected from a plurality of classification levels, wherein the plurality of classification levels correspond to different magnitudes of modification for advanced notification.

3. The method of claim 1, wherein the current conditions information includes information pertaining to a plurality of current conditions, and wherein the determining the adjustment parameter further comprises:

applying a weighting function to a plurality of values, wherein each of the values corresponds to one of the plurality of current conditions.

4. The method of claim 1, wherein the current conditions information comprises information pertaining to traffic conditions.

5. The method of claim 1, wherein the satellite-based navigation aid device is a Global Positioning System (GPS) device integrated with a telematics unit in the vehicle.

6. The method of claim 1, wherein the known hazard is a blind spot turn.

7. A satellite-based navigation aid device in a vehicle for providing navigation guidance warnings, comprising a tangible, non-transitory computer-readable medium having thereon computer-executable instructions, the computer-executable instructions comprising instructions for:

receiving input designating a destination for the vehicle;

determining a route comprising a plurality of segments between a starting point to the destination;

receiving current conditions information relating to a current segment of the plurality of segments;

receiving additional information relating to a known hazard located on a segment of the plurality of segments, wherein the known hazard corresponds to a roadway feature associated with a vehicle accident risk;

determining a guidance alert to be provided to the user relating to the current segment;

determining, based on the current conditions information and the additional information, an adjustment parameter representing modifying a magnitude for advanced notification of a driver action on the current segment;

recalculating a point on the current segment at which the guidance alert issues based upon a default value and the adjustment parameter; and presenting turn-by-turn (TBT) directions to a user based on the determined route;

wherein the computer-executable instructions further comprise instructions for, during the presenting the TBT directions, presenting the guidance alert at the point on the current segment and presenting a hazard alert notifying the user of the known hazard.

8. The device of claim 7, wherein the adjustment parameter is a classification level selected from a plurality of classification levels, wherein the plurality of classification levels correspond to different magnitudes of modification for advanced notification.

9. The device of claim 7, wherein the current conditions information includes information pertaining to a plurality of current conditions, and wherein determining the adjustment parameter further comprises:

applying a weighting function to a plurality of values, wherein each of the values corresponds to one of the plurality of current conditions.

10. The device of claim 7, wherein the current conditions information comprises information pertaining to traffic conditions.

11. The device of claim 7, wherein the device is a Global Positioning System (GPS) device integrated with a telematics unit in the vehicle.

12. The device of claim 7, wherein the known hazard is a blind spot turn.

* * * * *